Dec. 12, 1967  R. R. HAGER  3,357,317
SERVOMOTOR WITH LIMITED VALVE TRAVEL
Filed Oct. 21, 1965  2 Sheets-Sheet 1

INVENTOR.
ROBERT R. HAGER
BY
*Richard G. Geib*
ATTORNEY

Dec. 12, 1967   R. R. HAGER   3,357,317
SERVOMOTOR WITH LIMITED VALVE TRAVEL
Filed Oct. 21, 1965   2 Sheets-Sheet 2
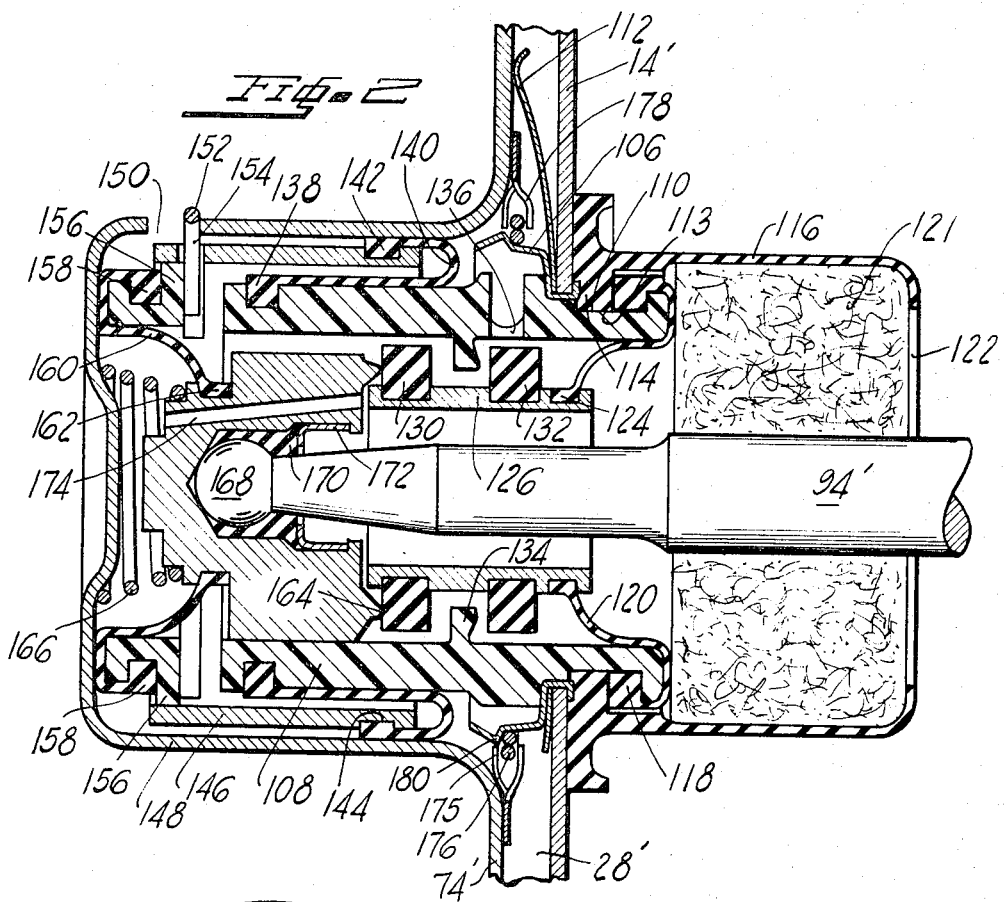
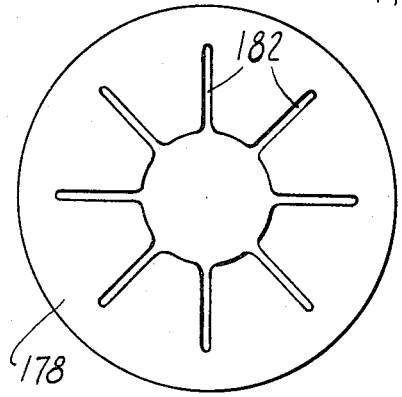
INVENTOR.
ROBERT R. HAGER
BY
Richard G. Geib
ATTORNEY United States Patent Office 3,357,317
Patented Dec. 12, 1967

3,357,317
SERVOMOTOR WITH LIMITED VALVE TRAVEL
Robert R. Hager, South Bend, Ind., assignor to The
Bendix Corporation, a corporation of Delaware
Filed Oct. 21, 1965, Ser. No. 499,209
9 Claims. (Cl. 91—391)

ABSTRACT OF THE DISCLOSURE

In a fluid pressure servomotor a valve means having a poppet portion thereof affixed to the servomotor housing and the movable seat portion thereof operably connected with a manual control means operably related with a movable wall for limiting valve travel that is releasably connected to the servomotor housing so as to be permissive of follow-up travel in the event of manual application of work from the servomotor.

---

This invention relates to a servomotor construction including a limited travel valve means which is releasably arranged to an operating means such that the operating means may separate from the valve means during no power, or run-out operation of the servomotor.

Due to increasing demands by industry as a whole, it has become quite apparent that servomotors should be capable of delivering a maximum of power with a minimum of effort by an operator. This is particularly true in operating the hydraulic brake systems of motor vehicles wherein it is necessary to equate the travel of the brake pedal to the travel of the accelerator pedal to thereby eliminate the groping for the brake pedal after the foot is removed from the accelerator pedal. It is quite obvious that if there is a difference in travel that reaction times and consequently stopping distances for the associated automobile will be increased.

However, it is also quite apparent that with such a system it is necessary to provide for manual actuation in the absence of power or during power run-out conditions. Thus it is necessary to provide means for manually pushing through the servomotor. It is a principal object of this invention to provide such a means for manual force application through a servomotor.

It is also necessary because of the ever increasing displacement requirements of systems to be actuated by a servomotor of the type herein suggested that every effort be made to reduce the size of the servomotor to the minimum.

It is, therefore, another object of this invention to provide a servomotor in accordance with the above object which is of reduced size than heretofore thought possible.

It is a more particular object of this invention to construct a servomotor having a valve means for controlling the operation thereof which valve means includes provisions to leave the majority of the valve elements behind during manual force application through the servomotor thereby eliminating the need for long protrusions from the servomotor that have heretofore been necessary to provide adequate chamber integrity thereof.

Other objects and advantages of my invention will appear from the following description of the drawings in which:

FIGURE 2 is a cross sectional view of a modified valving means which may be utilized in a servomotor in accordance with FIGURE 1 which modification is in accordance with the principles of my invention; and FIGURE 3 is an end view of a releasable connection for use in a valving structure such as shown in FIGURE 2.

Figure 1:
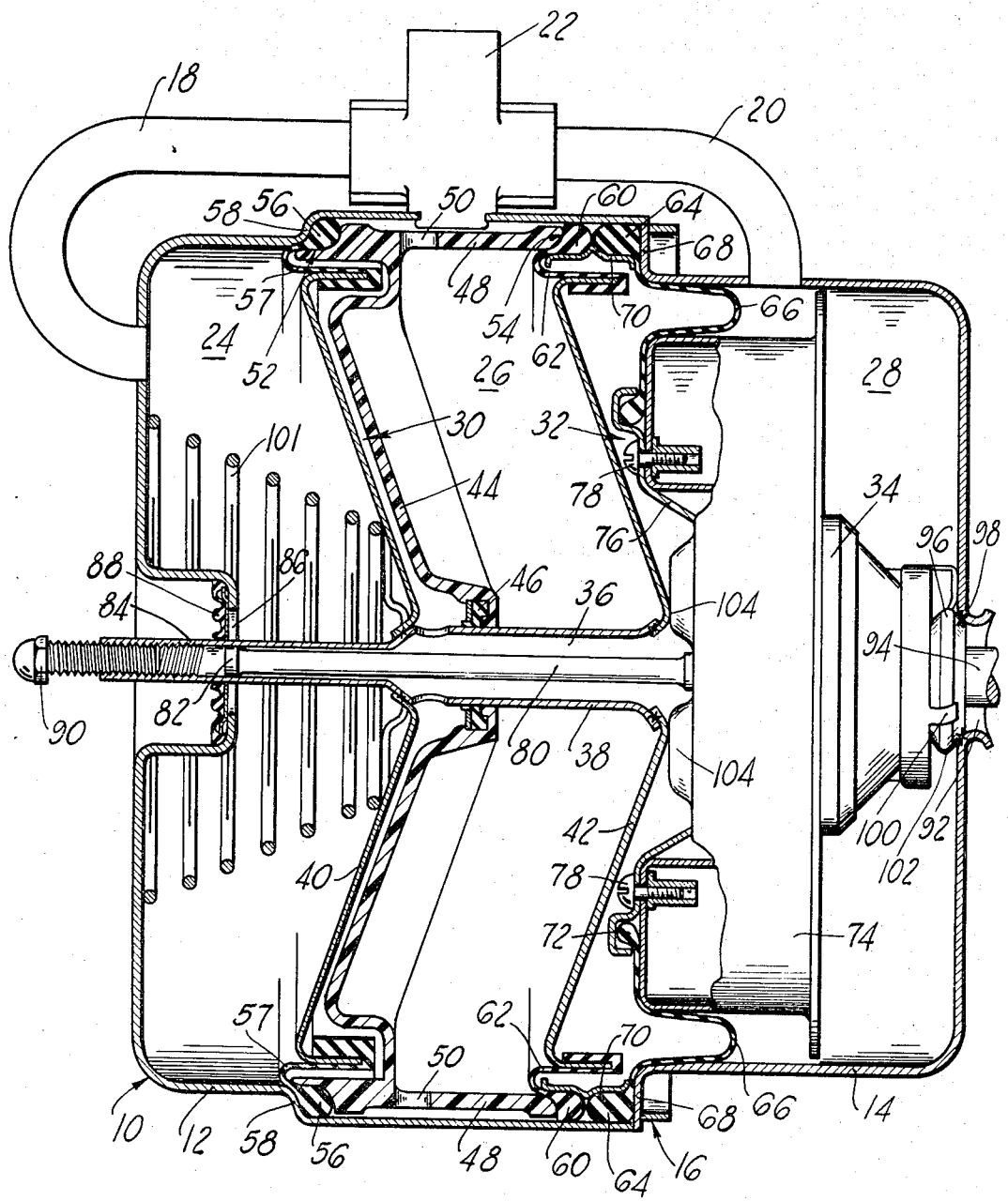
FIGURE 1 is a cross sectional view of a servomotor in accordance with the principles of my invention.

With particular reference now to FIGURE 1 there is shown a servomotor 10 made from a forward shell portion 12 and a rearward shell portion 14 that are assembled by means of a twist lock arrangement, as at 16 which may be more particularly observed in the description thereon appearing in U.S. Patent No. 3,146,682 assigned to the common assignee.

The shell portions 12 and 14 are in fluid communication by means of conduits 18 and 20 that are joined by a T-section 22. The T-section is affixed to shell 12. While not shown, the T-section 22 incorporates, internally, a check valve to maintain fluid pressure in servomotor 10. As shown, the servomotor 10 is designed to operate by means of communicating a vacuum pressure to the T-fitting 22. This vacuum pressure is communicated through the T-fitting and conduits 18 and 20 to variable volume chambers 24, 26, and 28. Furthermore, the servomotor 10 comprises variable volume control chambers 30 and 32 which are in the released position shown, in communication via means of valve casing 34 with the variable volume chambers 24, 26 and 28. This is accomplished by means of a central, internal passage 36 within a tubular connection 38 joining movable walls 40 and 42 in that passage 36 is open at each end of the tube 38 to the chambers 30 and 32.

In order to separate the control chamber 30 from the variable volume chambers 24 and 26 there is provided a partition 44. This partition is constructed to carry a seal 46 at an inward opening therethrough, which seal cooperates with the tube 38 to slidably and sealingly support its reciprocation in the servomotor 10. At the radial peripheral extent of the partition 44 there is provided an axial flange 48 which has a plurality of spaced openings 50 therethrough to permit communication of fluid pressure supplied by the T-fitting 22 to the front shell portion 12 to within the variable volume chamber 26. Furthermore, the axially extending flange 48 can be formed of a plastic material and will have abutment surfaces 52 and 54 at each end thereof which compress a bead 56 of a diaphragm 57 joining the movable wall 40 to the rear portion 12 against a shoulder 58 of the shell portion 12, and which will at the other end force a beaded portion 60 of a diaphragm 62 joining the movable wall 42 to the forward shell portion 12 against a beaded portion 64 of yet another diaphragm 66 such that the beaded portions 60 and 64 of the respective diaphragms are compressibly held between the face 54 of the flange 48 and a radially outwardly projecting flange 68 of the rear portion 14. In addition, in order to maintain the radial location of the beads 60 and 64 there is provided an annular ring 70 whose diameter is chosen to radially compress the beads 60 and 64 against the innermost surface of the shell portion 12.

The innermost ends of the diaphragms 66 are formed as an annular bead 72 which is held to a movable wall 74 by means of a diaphragm retainer 76 that is located on the movable wall by a plurality of bolts 78. Furthermore, the movable wall 74 is arranged in the rear shell portion 14 to abut a guiding rod 80 that terminates in a supporting surface 82 carried by a stepped down portion 84 of the tube 38. The stepped down portion 84 projects from the servomotor 10 through an opening 86 at the left end thereof, which opening is provided with a seal 88 for maintaining the integrity of the variable volume chamber 24. Furthermore, the portion 84 is threaded internally to receive an adjustable bearing member 90 that will permit an adjustment in the assembly to the servomotor of a pressure generating device, such as a master cylinder, so that tolerance stack-up and servomotor construction will be of no concern to this assembly.

The rear shell portion 14 is also provided with an opening 92 through which a valve operating rod 94 extends rearwardly to a connection with an operator-operated control member, such as a brake pedal. The opening 92 is sealed by means of a conical shape cam member 96 being annularly welded as at 98, to the rear shell portion 14. This cam surface receives a plurality of spring fingers 100 that depend from the right end of the valve casing 34 and are arranged to rest immediately behind an apex 102 of the surface 96 to thereby unite the valve casing 34 to the rear housing portion 14.

In operation of this servomotor 10, an operator will actuate a device, such as a brake pedal, to project the control rod 94 inwardly of the servomotor to remove a valve seat from a valve poppet allowing the valve poppet to seat upon a fixed seat (all of which are more particularly described with reference to FIGURE 2) to thereby closed off communication of vacuum pressure supplied to T-fitting 22 from the control chambers 32 and thence 30 and theereafter supply a different pressure, such as atmospheric pressure entering the opening 92 in the rear shell portion 14 that passes internally of the cam surfaces 96 to the control chamber 32 and thence 30 via passage 36. This will create a pressure differential across each of the walls 40, 42, and 74. However, it should be noted that the pressure differential on the walls 40 and 42 will project the stepped down portion 84 from the servomotor to actuate the pressure generating device (not shown); whereas the pressure differential on the wall 74 will react in an opposite direction to maintain limited travel of the valve casing and consequently the control rod 94. Also, wall 74 provides a sense of feel to enable an operator to properly modulate the servomotor 10.

In the event the pressure differential is not great enough to sufficiently actuate the pressure generating device, then further force on the control rod 94 will cause the deformation of spring fingers 100 to ride over the apex 102 of the cam surface 96 moving the wall 74 and rod 80 forwardly. Upon abutment of the raised portions 104 of the wall 74 with the wall 42, manual force is applied to the tube 38 and its stepped down portion 84. Therefore, spring fingers 100 will hold back the valve casing, but upon release from surface 96 they will not further impede manual force transmission through the servomotor 10. A return spring 101, after release of the forces on control rod 94, will recock the spring fingers 100 on surface 96.

Referring next to FIGURE 2, I have shown a construction of a balanced valve for controlling a servomotor such as depicted by FIGURE 1 which utilizes the principles of my invention. More particularly, there is shown an annular stamped member 106 which is riveted to the rear portion 14' of the servomotor. The stamped member 106 affixes an inner end of a counterreaction spring 112 to shell 14'. Further the annular groove 110 is stepped down as at 113 to receive a thickened portion 114 of a rubber boot 116 and a beaded portion 118 of a diaphragm 120. The rubber boot 116 encloses a filter 121 surrounding the push rod 94'. This boot is opened as at 122 to permit atmospheric communication to the filter, and the thickened portion 114 seals the servomotor to the structure to which it is assembled; i.e., a vehicle firewall.

The diaphragm 120 terminates in an annular opening prescribed by a beaded portion 124 that supports a valve poppet retainer 126 spaced from the control or push rod 94'. The valve poppet retainer 126 supports a pair of annular poppet rings 130 and 132 that are located to either side of a depending fixed seat 134 from the sleeve 108. The sleeve 108 is drilled at spaced intervals, as at 136 to provide fluid communication from the variable volume chamber 28' internally of the sleeve 108 behind the fixed depending seat 134. Furthermore, the sleeve receives at its innermost end an annular bead 138 of a diaphragm 140 that is also provided with an outer bead 142 that is compressed between a groove 144 in a tubular casing portion 146 and a forwardly projecting boss 148 of the movable wall 74'. This boss 148 is opened at 150 to the control chamber, such as control chamber 32 of FIGURE 1, immediately forward of the wall 74' and is further united with the tubular casing portion 146 by means of a retainer ring 152 having an inwardly projecting tab 154. Furthermore, the casing 146 is closed at its forward end by a plastic ring 156 that carries a bead 158 of a diaphragm 160 that projects inwardly to a bead 162 supporting a movable valve seat 164. This movable valve seat 164 is biased rearwardly by means of a spring 166, and it is joined with the control rod 94' by means of a spherical head 168 on the rod that is held in the movable valve seat by a rubber block 170 and a retainer ring 172 affixed to the movable valve seat 164. Also the movable valve seat is provided with an axial passage 174 to equalize the pressures on diaphragms 120 and 160 to provide balanced valving for the servomotor 10.

In order to releasably hold the casing 146 and movable wall 74' to the rear portion 14' of the servomotor there is provided a plurality of spring rings 175 and 176 that are positioned with respect to the member 106 by means of a forked spring retainer 178, so that the rings 175 and 176 may ride over a radially enlarged portion 180 of the member 106 upon sufficient force being applied to the control rod 94'. The retainer 178 is constructed to have a plurality of notches 182, as seen in FIGURE 3 so that adjacent sections may be axially displaced to form the forked portion.

As the operation of this valve means is considered obvious to those skilled in the art to which my invention relates, especially after consideration of the operative description for FIGURE 1, it is not considered necessary to dwell further on it.

The retainer 178 and member 112 may be formed as a single member.

There is now presented a set of claims defining the scope of my invention.

I claim:

1. A servomotor comprising:
   a housing having a chamber therein;
   a movable wall means operably arranged in said housing;
   a valve means including a casing operably connected to a portion of said movable wall means and a valve poppet connected to said housing;
   a spring connection affixed to said housing and operably connected to said casing; and
   means to operate said valve means which in absence of sufficient pressure differential across said portion of said movable wall means mechanically releases said connection to manually move said wall means in said housing while leaving said valve poppet affixed to said housing behind.

2. A servomotor according to claim 1 wherein said valve means is characterized as having a movable valve seat operatively arranged in said casing and operable with said valve poppet, said movable valve seat being connected to said means to operate said valve means; a sleeve sealingly connected to said housing and said valve casing, said sleeve having an annular fixed valve seat arranged to receive said valve poppet after said movable valve seat is moved away from said poppet; and pressure responsive means for resisting movement of said movable valve seat which normally spaces said poppet from said fixed valve seat.

3. A servomotor according to claim 2 wherein said pressure responsive means is characterized as having a first diaphragm uniting said poppet and said sleeve, a second diaphragm connecting said movable valve seat to said casing, and a third diaphragm connecting said casing and said sleeve.

4. A servomotor according to claim 3 wherein said spring connection includes an annular clip affixed to said housing; a spring ring means operably associated with said spring clip; and a spring retainer holding said spring ring means to said movable wall.

5. A servomotor according to claim 4 wherein said spring retainer is characterized as a forked structure having a radial cavity to permit expansion of said spring ring means thereby releasing the movable wall from the housing.

6. A servomotor according to claim 1 wherein said releasable connection is characterized as including a plurality of spring fingers affixed to and depending from said movable wall; and a conical shaped cam surface on said casing to receive the innermost ends of said spring fingers to unite said wall and said casing so that upon sufficient force being applied to said movable wall said fingers are deformed to ride over the apex of said conical surface and release said movable wall from said casing.

7. A servomotor according to claim 1 wherein said releasable connection includes an annular spring clip affixed to said housing; a spring ring means operably associated with said spring clip; and a spring retainer holding said spring ring means to said movable wall.

8. A servomotor according to claim 1 wherein said movable wall means includes a first wall; a second wall; means to unite said first and second walls, a force transmitting means operably connected to said means uniting said first and second walls; and a third wall forming said portion operably connected to said valve means for holding said valve means steady regardless of motion of said first wall and said second wall until said means mechanically releases said connection and manual force overcomes the pressure differential, if any, across said third wall.

9. A servomotor according to claim 8 and further including a counterreaction means operatively connecting said third wall and said housing to proportion the holdback forces created by a pressure differential thereacross acting thereon between said housing and said means to operate said valve means.

References Cited

UNITED STATES PATENTS

| | | | |
|---|---|---|---|
| 3,032,806 | 5/1962 | Mallory | 92—23 |
| 3,067,727 | 12/1962 | Ayers et al. | 91—391 |
| 3,075,499 | 1/1963 | Prather | 91—434 |
| 3,093,119 | 6/1963 | Stelzer | 91—391 |
| 3,173,659 | 3/1965 | Hemmeter | 92—23 |

MARTIN P. SCHWADRON, *Primary Examiner.*

PAUL E. MASLOUSKY, *Examiner.*